United States Patent Office 3,247,694
Patented Apr. 26, 1966

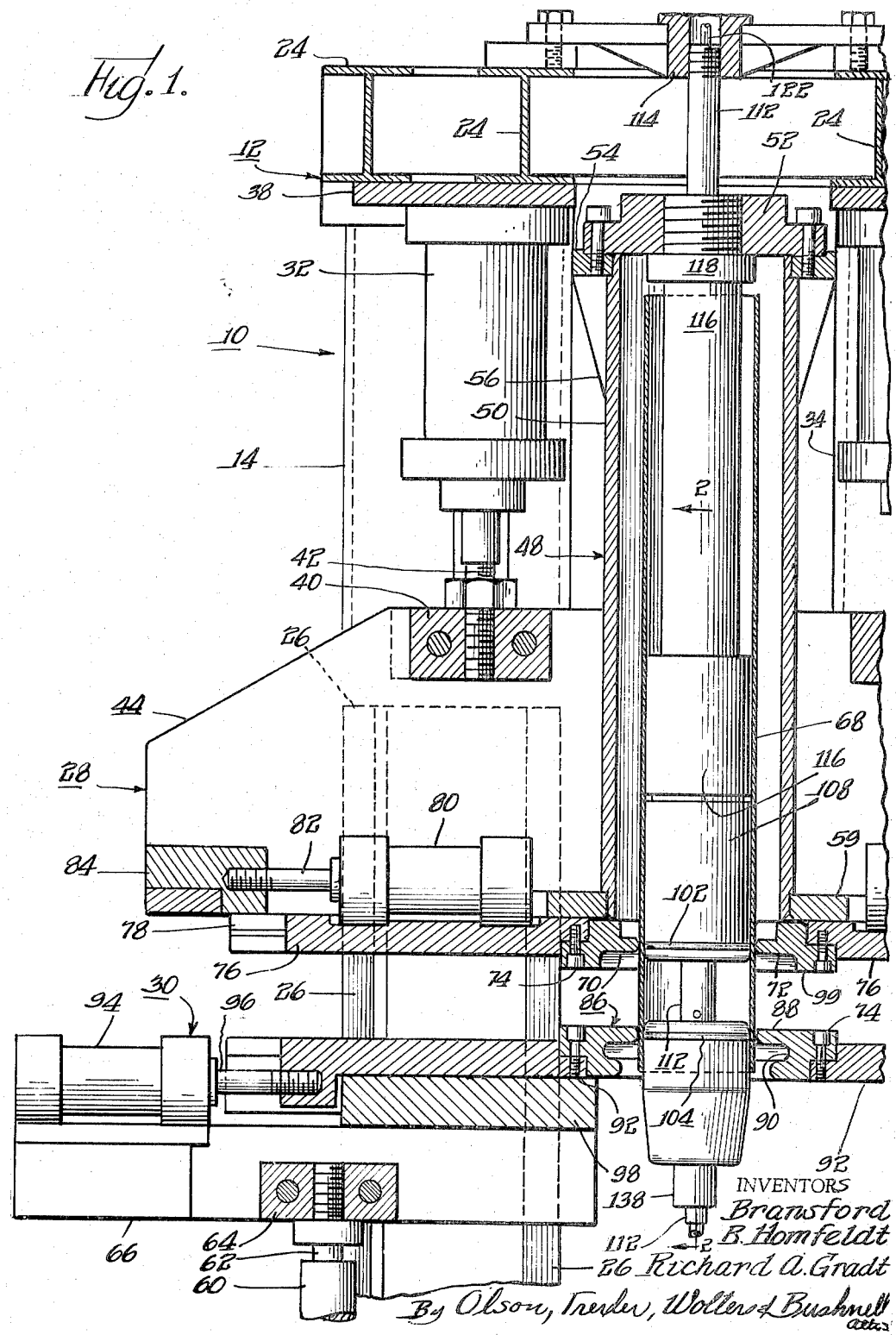

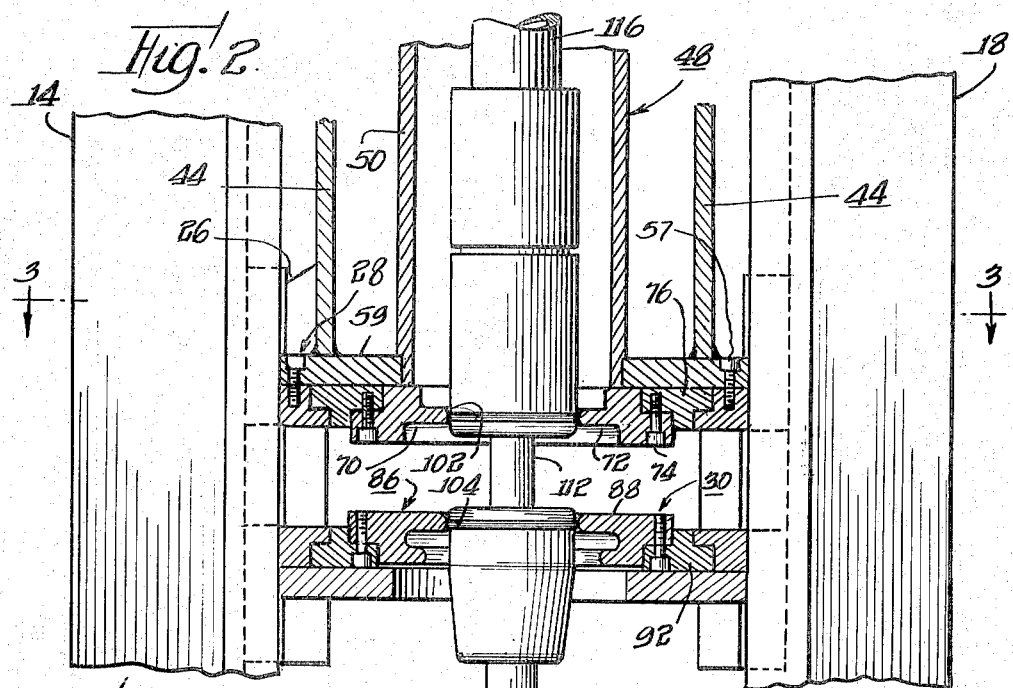
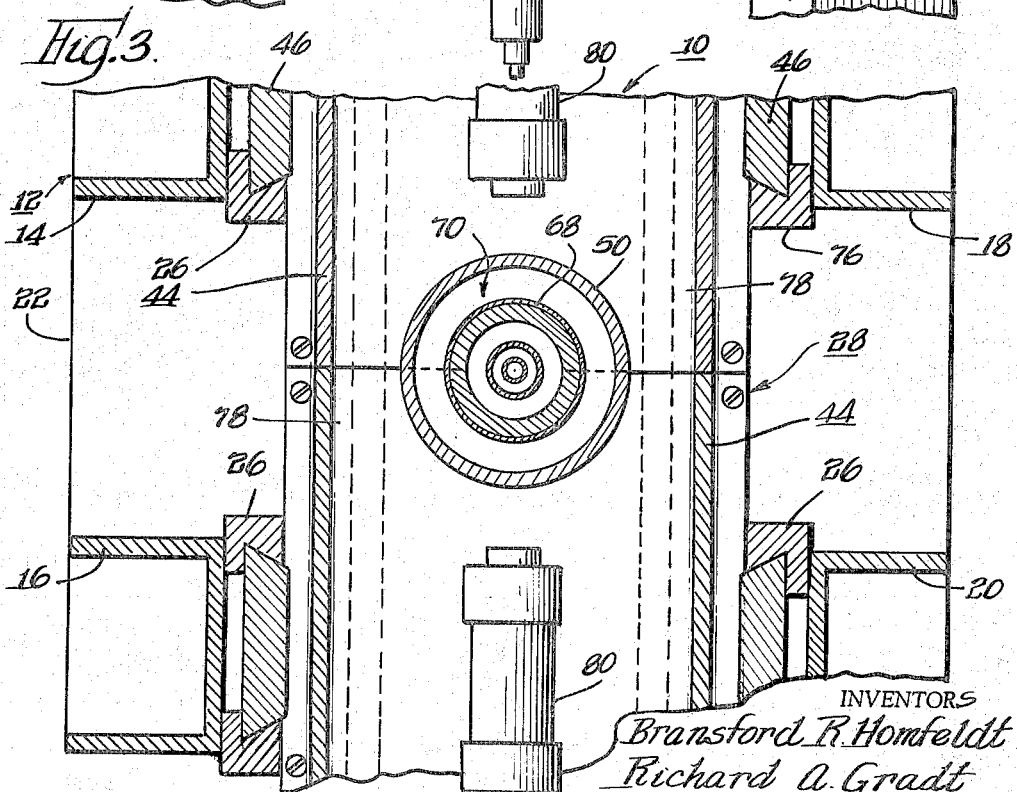

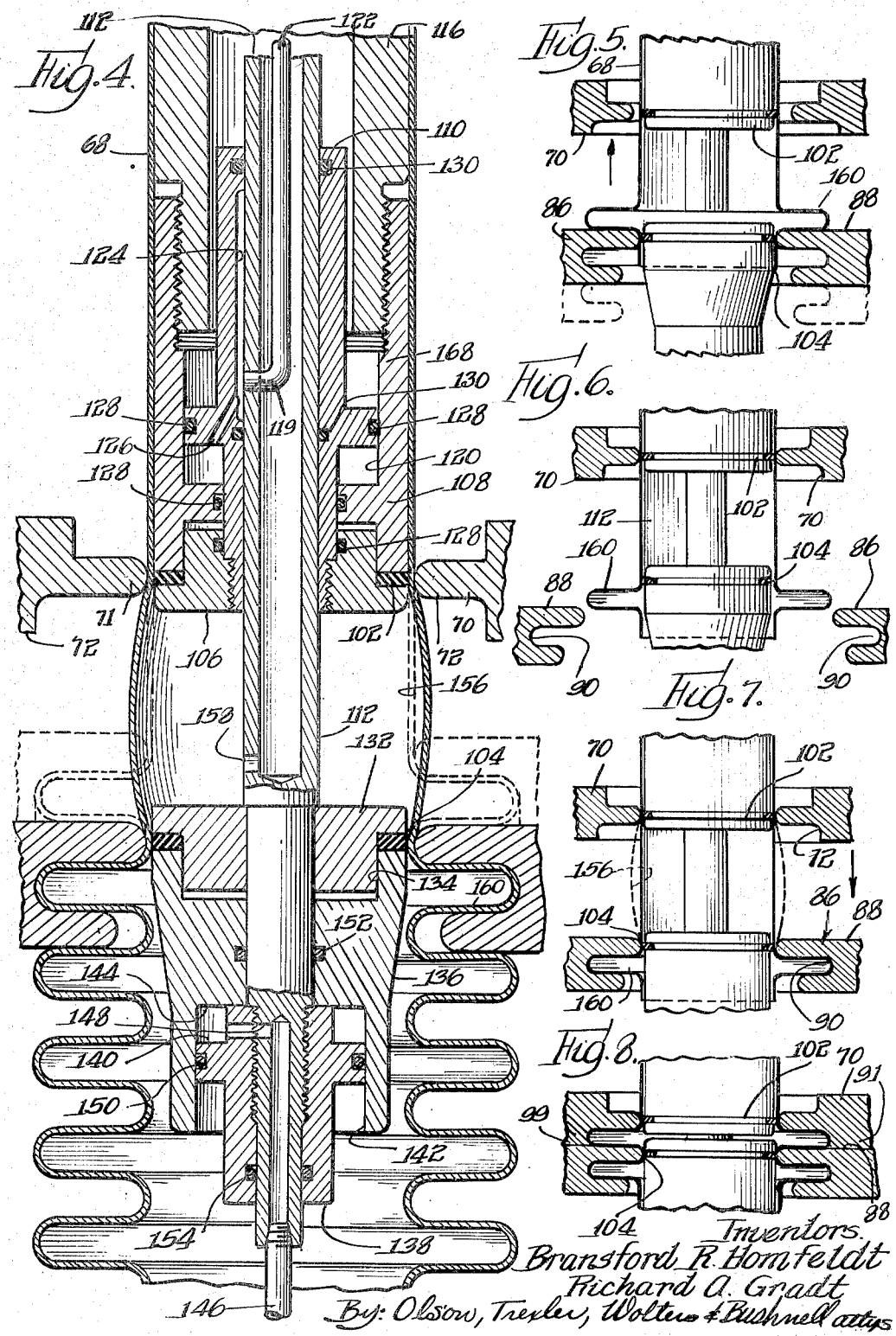

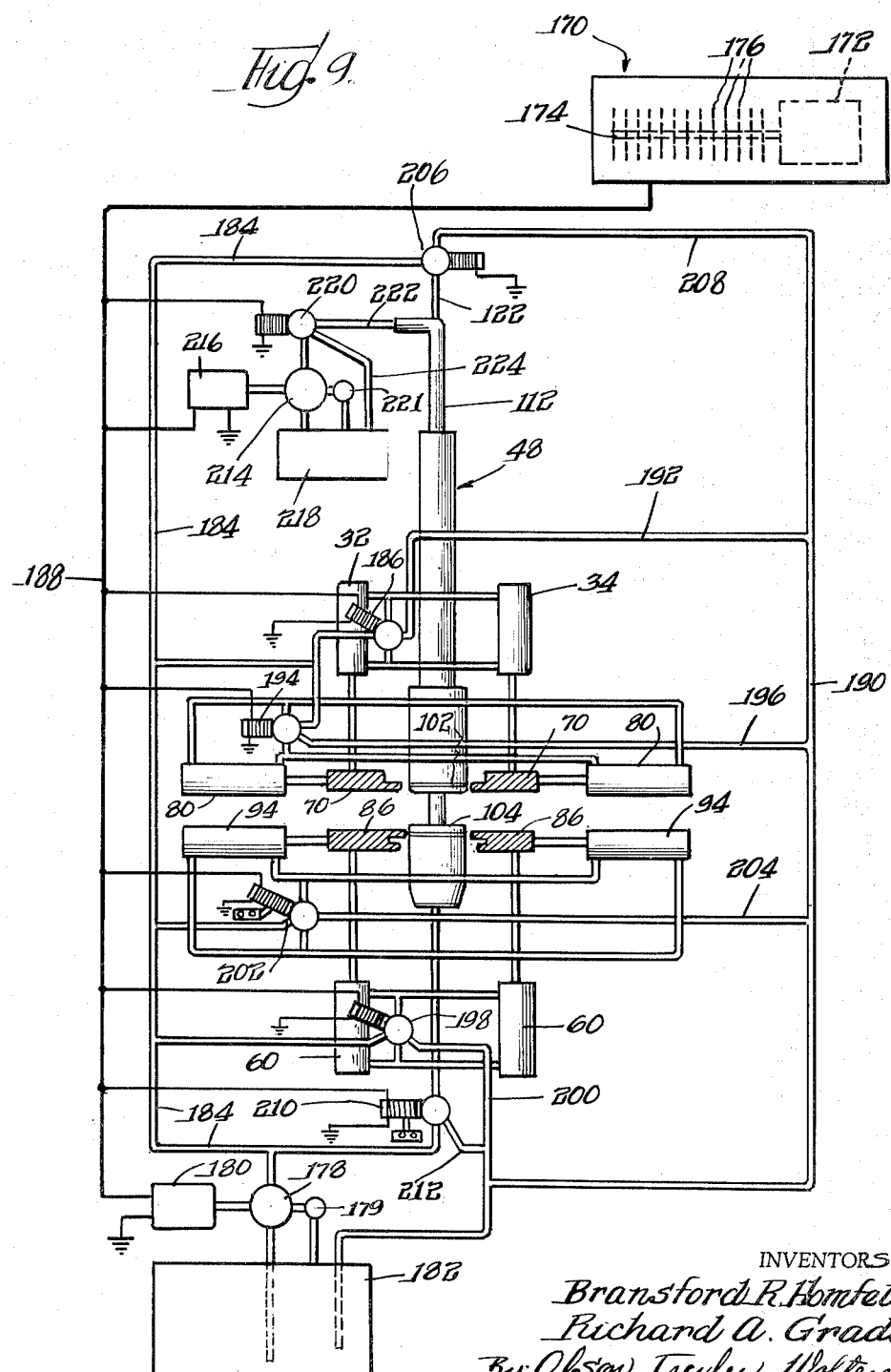

3,247,694
METHOD AND MEANS FOR FORMING CORRUGATIONS ON TUBING
Bransford R. Homfeldt, Elgin, and Richard A. Gradt, Dundee, Ill., assignors to Calumet & Hecla, Inc., Chicago, Ill., a corporation of Michigan
Filed Jan. 25, 1962, Ser. No. 168,741
7 Claims. (Cl. 72—59)

This invention pertains generally to metal forming and, particularly relates to an improved method and apparatus for forming annular corrugations on tubing.

Among the known methods of forming corrugations on metal tubing is one which utilizes the radial flexure of an elastomeric or rubber ring to form the initial bulge in the tubing sidewall. Once the initial bulge is formed, the rubber ring is relaxed and the tubing is axially compressed to complete the formation of an annular corrugation.

It has long been known that by the use of such a method, although quite satisfactory in many respects, a corrugation is produced which has "dished" as contrasted to flat or substantially straight sidewalls. In the prior method of fabricating, annular convolutions in metal tubing with flat sidewalls could rarely be produced with any degree of uniformity.

Another aspect of the above metal forming procedure is the limitation of height or outside diameter of the corrugation in relation to the inside diameter of the tubing. In an application where a corrugation is desired having an outside diameter 50% or more greater than the tubing inside diameter, the elastomeric ring may rupture due to the induced stresses after two or three corrugations are formed, the ring thereafter being no longer useable. Hence, it was found that in the prior method the height of the corrugation was principally a function of the properties of the elastomeric material rather than directly related to the property of the metal to elongate.

Accordingly, an important object of this invention is to provide an improved method and means for forming annular corrugations in thin wall tubing which method and means overcome the objections of previous modes.

A more specific object of the invention is to provide an improved method for forming corrugations on tubing in which internal fluid pressure is maintained against the sidewalls of the tubing throughout the process for forming a corrugation.

Still another object is to afford improved corrugation forming apparatus which incorporates means to facilitate varying the pitch of the axially spaced corrugations.

Yet another object is to provide a method as defined in the above objects, such method being especially advantageous in forming annular corrugations having outside diameters greater than 50% of the inside diameter of the tubing.

Still another object of the invention is to provide an improved method, as described in the foregoing objects, such method being advantageous for forming annular corrugations having substantially flat sidewalls.

Yet another object of this invention is to provide an apparatus of the type described wherein seals of elastomeric material are mounted for limited outward flexure thereby affording long service life to the seals.

Still another object is to provide an apparatus of the type described in the preceding object wherein one seal is operatively disposed to form a fluid tight junction at the root of a corrugation previously formed.

A further object is to provide a machine of the type described, such machine having means for gripping the tubing to form a corrugation and to axially advance the tubing to the position for receiving the next subsequent corrugation.

Further features of the invention pertain to the particular arrangement of the steps of the method employed therein as well as the construction of the apparatus thereof whereby the above-outlined and additional operating features are attained.

This invention, both as to its organization and method of operation, together with further objects and advantages, will best be understood by reference to the following specification taken in connection with the accompanying drawings wherein like reference numerals designate like parts throughout, in which:

FIGURE 1 is a fragmentary, vertical sectional view of a corrugation forming apparatus embodying the principles of the present invention, a length of tubing being shown mounted in position for forming an annular corrugation.

FIG. 2 is a fragmentary, vertical sectional view taken in the direction of the arrows along the line 2—2 in FIG. 1, the length of tubing shown in FIG. 1 being omitted in FIG. 2;

FIG. 3 is a fragmentary, horizontal sectional view taken in direction of the arrows along the line 3—3 of FIG. 2, the tubing of FIG. 1 being shown in FIG. 3;

FIG. 4 is an enlarged, fragmentary, vertical sectional view of an arbor assembly of the apparatus shown in FIG. 1, the arbor assembly being illustrated in association with the length of tubing;

FIGS. 5 to 8 are fragmentary vertical sectional views on a reduced scale showing a sequence of operations of the machine of FIG. 1 wherein a corrugation is formed in the sidewalls of the tubing; and FIG. 9 is a schematic illustration of the automatic control circuit incorporated in the machine of FIG. 1.

Referring now to FIGS. 1 and 3 of the drawings, there is shown a machine for forming corrugation on tubing, the machine being designated generally by the numeral 10 and is made in accordance with and embodies the features of the present invention. Certain portions of the corrugation forming machine 10 have been shown fragmentarily or have been omitted for purposes of clarity since it is believed that such portions will be obvious to those skilled in the art. Referring now specifically to FIG. 3, the machine 10 includes a frame 12 comprising four upstanding posts 14, 16, 18, and 20 arranged in opposed pairs each having its lower end rigidly secured to a horizontally disposed base plate 22. Transversely extending I beams 24, shown in FIG. 1, interconnect the upper ends of the posts 16–20 thereby to form a sturdy and rigid framework for the machine 10.

A vertically extending way 26 is rigidly mounted on the center section of each of the posts 16–20 to afford guide means for two vertically displaceable sub-frames or stages, a first or upper sub-frame being designated generally 28 in FIGS. 1 and 2, and a second or lower sub-frame being designated generally 30. The sub-frames 28, 30 are mounted for controlled vertical movemnts along the way 26, each of the sub-frames being operable independently of the other.

The upper sub-frame or stage 28, shown best in FIG. 1, is moved vertically along the ways 26 by two vertically oriented, hydraulic cylinders 32 and 34. The hydraulic cylinder 32 is fixedly secured to a horizontally extending plate 38 secured to the transversely extending I-beam members 24. Extending vertically downwardly from the plate 38, the cylinder 32 includes a piston rod 42 threadably connected to a cross member 40 of the substage 28. Each end of the cross member 40 is rigidly secured to a vertically extending side plate 44 which has secured thereto a guide member 46 (shown in FIG. 3) slidably movable along the ways 26.

The hydraulic cylinder 34 is of similar construction and arrangement to the cylinder 32 and is connected to the same hydraulic circuit which will be presently described in detail below.

Mounted centrally between the hydraulic cylinders 32 and 34 is an arbor assembly generally designated 48 including a cylindrical outer casing 50 rigidly secured to the upper subframe 28. The casing 50 is movable vertically with the subframe 28 and is connected at its upper end to a massive closure assembly 52 including a flange 54 joined to the casing 50 by a plurality of circumferentially spaced gusset plates 56, as shown in FIG. 1. The lower end of the casing 50 is rigidly secured to a horizontally disposed annular flange 59 which, in turn, is fixedly secured to the lower portion of the subframe 28 by a plurality of fasteners 57, as shown in FIG. 2.

It is to be appreciated that the hollow casing 50 has an inside diameter adequate to accomodate various diameters of metal tubing which may be disposed therein to receive corrugations.

Means are included on the subframe 28 to vary the distance of vertical displacement thereof along the ways 26. This feature provides for forming annular corrugations having various outside diameters in relation to the inside diameter of the tubing. It is to be recognized that the means for varying the stroke of the substage 28 is associated with the travel of the piston rods 42 which urge the stage 28 toward and away from the base plate 22.

The lower subframe or stage 30 is in many respects similar to the upper substage 28, and includes a pair of vertically orientated hydraulic cylinders 60, only one being shown in FIG. 1. As in the case for the cylinder 32, the base of each cylinder 60 is rigidly secured to the frame 12. A piston rod 62 extends vertically outwardly from the cylinder 60 and is threadably received in a cross member 64. Each end of the cross member 64 is rigidly secured to a side plate 66 of the substage 30. The vertically arranged sideplate 66 carries thereon guide means co-operable with the ways 26 for maintaining the second substage 30 in exact alignment for vertical movements along the way 26.

The hydraulic cylinders 60 associated with the second sub-frame 30 are disposed in a hydraulic circuit, to be more fully described hereinafter, independent of the circuit incorporating the cylinders 32 and 34 of the first subframe 28. By this arrangement, the first subframe 28 may be moved independently of the circuit incorporating the cylinders 32 and 34 of the first subframe 28. By this arrangement, the first sub-frame 28 may be moved independently of the second sub-frame 30. Indexing means are provided in association with the travel of the piston rods 62 of the sub-frame 30 whereby to control selectively the distance of vertical travel of the subframe 30.

Means are provided on each sub-frame 28, 30, to rigidly clamp portions of a length of tubing 68 firmly to the respective subframe. Referring to FIGS. 1–3, the first substage 28 is provided with a set or pair of split movable dies 70 defining, when in the closed position, a downwardly opening annular cavity 72. The sidewalls of the cavity 72 are designed complementary to the desired shape of the corrugation intended to be formed. Each split die of the pair 70 is fixedly secured by a plurality of cap screws 74 to a frame member 76 horizontally slideable along an assembly of horizontally disposed ways 78, shown best in FIGS. 1 and 3. A hydraulic cylinder 80 is mounted on each frame member 76, a movable piston rod 82 of the cylinder 80 being rigidly secured to a cross member 84. Each end of the cross member 84 is rigidly secured, as by welding, to the upstanding sideplates 44 of the first substage 28.

As the piston rod 82 is retracted into the cylinder 80 the split dies 70 are moved apart and becomes disengaged from the sidewalls of the tubing 68. Conversely, as the rod 82 is extended from the cylinder 80 the dies or jaws 70 are urged into firm and gripping engagement with the sidewalls of the tube 68.

A second set or pair of split dies 86 are associated with the second or lower substage 30, as clearly shown in FIGS. 1 and 2. An upper surface 88 of the dies 86 is substantially flat as contrasted with the cavity 72 on the dies 70. The second split dies 86 are provided with a corrugation receiving cavity 90 arranged below the planar surface 88. The cavity 90, when the dies 86 are closed, functions to encompass a corrugation previously formed in the operation of the machine 10, whereby to support the tubing 68 during an indexing operation to be more fully described hereinafter.

The second split dies 86 are fixedly secured, as by cap screws 74 to a frame member 92 which is horizontally movable along the second substage 30. Associated with each member 92 is a hydraulic cylinder 94 fixedly secured to the second subframe 30. A piston rod 96 is threadably connected to the member 92 whereby to move the associated die member 86 in response to movement of the rod toward and away from the arbor assembly 48. The frame member 92 is guided in a horizontal plane along the substage 30 by ways or guide means 98 similar in construction and arrangement to the guide means 78 on the first subframe 28.

The substages 28, 30 and die sets 70 and 86 are so constructed and arranged whereby when the first substage 28 is moved downwardly, an annular shoulder portion 99 of the upper dies 70 engages the planar surface 88 of the second die 86, best shown in FIG. 8. In this condition the surface 88 forms a closure to the cavity 72, the resulting cavity then being complementary in shape to the corrugation to be formed in the sidewalls of the tubing 68.

It is to be noted that the dies 70 and 86 are selectively retractable upon actuation of the respectively associated pairs of hydraulic cylinders as well as being advanceable to afford gripping engagement with the tubing 68. At those points on the tubing 68 gripped by the dies 70 and 86 elastomeric sealing means are provided and adapted to be disposed within the tubing 68 to form spaced apart fluid tight junctions, thereby to define a pressure chamber within the tubing 68.

Referring now to FIGS. 1 and 4, a first seal 102 is arranged on the arbor assembly 48 to selectively engage the inside of the tubing 68 adjacent that part of the tubing gripped by the first dies 70. A second seal 104 is spaced from the first seal 102 on the arbor assembly 48 and is adapted to provide a second fluid tight junction with the inside of the tubing 68 adjacent that portion of the tubing 68 gripped by the second dies 86.

Means are provided on the arbor assembly 48 to axially compress the first seal 102 thereby urging the body thereof outwardly into engagement with the tubing 68. More specifically, the elastomeric seal 102 being generally flat and annular in shape is arranged between confronting annular surfaces of a nose piece 106 and a coacting thrust sleeve 108. The nose piece 106 is threadably engaged to the lower end of a hollow, longitudinally extending collar 110, the collar 110 being mounted for axially sliding movements along a hollow spindle 112. The uppermost end of the spindle 112 is threadably received in a bushing 114 fixedly secured at the upper portion of the frame 12, shown in FIG. 1.

The thrust sleeve 108, a hollow cylindrical member threadably engaging a tubular strut 116, moves vertically in response to movements of the first subframe 28. This function obtains from the fact that the tubular strut 116, which has a diameter at the lower portion thereof generally complementary to that of the inside diameter of the tubing 68 and has a longitudinally extending upper portion of reduced diameter, is rigidly secured at its upper end member to a flange 118 threadably received within the fitting 52 on the subframe 28.

A first annular chamber 120 is provided between the thrust sleeve 108 and collar 110 to receive hydraulic fluid under pressure thereby to move the collar 110 and the connected nose piece 102 upwardly with respect to the sleeve 108 thereby to compress the rubber body of the first seal 102. Hydraulic fluid under pressure is supplied to the first chamber 120 through a hydraulic conduit 122 extending through the hollow spindle 112, the lower end of the conduit 122 terminating in an L portion fixedly secured in an aperture 119 opening into an inner chamber 124 in the collar 110. The chamber 124 communicates with the first chamber 120 through a connecting passageway 126.

A fluid tight seal is maintained between the confronting surfaces of the thrust sleeve 108 and collar 110 by a pair of rubber O-rings 128 suitably disposed in complementary recesses. A third O-ring 128 is also provided between the nose piece 106 at the lower end of the collar 110, clearly shown in FIG. 4.

When hydraulic pressure is applied to the chamber 120 the seal 102 is squeezed between the sleeve 108 and nose piece 106 sufficiently to bulge a portion of the rubber-like seal 102 outwardly into engagement with the tubing 68. Hydraulic pressure is maintained within the chamber 120 as the sleeve 108 is moved downwardly with respect to the spindle 112. To maintain a fluid tight yet sliding relationship between the spindle 112 and the inner bore of the collar 110 a pair of axially spaced rubber O-rings 130 are provided therebetween.

The second elastomeric seal 104 is flexed outwardly to form a junction with the tubing 68 in a manner somewhat similar to the first seal 102. More specifically, a second or lower nose piece 132 is fixedly mounted on the spindle 112 below the first nose piece 106. The second nose piece 132 extends into a cavity 134 in the upper surface of a downward tapering thrust mandrel 136. The second seal 104 is operatively mounted between the confronting shoulder portions of the second nose piece 132 and the mandrel 136 is urged outwardly into engagement with the tubing 68 as the mandrel 136 is forced upwardly toward the nose piece 132.

More specifically, a bushing 138 having an outwardly extending annular flange 140 is threadably received over the lower extremity of the spindle 112. A skirt 142 of the mandrel 136 extends over the bushing 138 to define a second annular chamber 144 which receives hydraulic fluid under pressure from a hydraulic conduit 146. The conduit 146 delivers fluid into the hollow lower end of the spindle 112 and communicates with the chamber 144 through a horizontal passageway 148. A fluid tight relationship is maintained between the mandrel 136 and bushing 138 by an O-ring 150 suitably arranged in the flange 140. A pair of O-rings 152 and 154 respectively provide fluid tight seals between the spindle 112 and mandrel 136 and between the spindle 112 and bushing 138.

Thus it is seen that when hydraulic fluid under pressure is admitted to the chamber 144 the thrust mandrel 136 is urged upwardly against the second seal 104. The second nose piece 132 being fixedly secured to the spindle 112 provides a reaction force for squeezing the body of the seal 104.

When the first 102 and second 104 seals are actuated to engage the tubing 68, spaced apart fluid tight junctions are formed and define a pressure chamber 156 within the tubing 68. When fluid pressure is applied within the chamber 156 the tubing sidewalls bulge outwardly, as shown in FIG. 4. In the exemplary embodiment of the invention, water under pressures in the range from 2000 to 4000 p.s.i. may be supplied to the chamber 156 through the hollow spindle 112.

An aperture 158 through the wall of the spindle 112 permits the water from the spindle 112 to be admitted into the chamber 156. It is to be noted that the aperture 158 is disposed but a short distance above the upper surface of the second nose piece 132. This distance is selected so that when the limit of downward travel of the first nose piece 106 is attained, the aperture 158 is not closed off by the first nose piece 106.

In the sequence of operations of the corrugation forming machine 10, corrugations are formed one at a time at predetermined axially spaced points along the tubing 68. The first step in the sequence is to slide a length of tubing 68 upwardly over the thrust mandrel 136 from the bottom of the machine 10. During this step, the seals 102, 104 are relaxed and the gripping dies 70, 86 are retracted so as to afford easy movement of the tubing 68 upwardly on the mandrel assembly 48.

Thus, when the tubing 68 is in position on the machine 10 as shown in FIG. 1, it is held in place by closing the second split dies 86 and by actuating the second or lower seal 104. In this operation a fluid tight junction is formed within the tubing by the seal 104, and the exterior of the tubing 68 is rigidly gripped opposite the seal 104 by the dies 86.

The first subframe or substage 28 is moved to the top of the predetermined stroke, as shown by the arrow in FIG. 5, prior to closing the gripping dies 70 and actuating the first seal 102. When the first dies 70 are closed about the tubing 68, the first seal 102 is flexed to form a fluid type joint with the inside walls of the tubing 68. At this point the condition is established for supplying through the spindle 112 a quantity of water under high pressure. The water or other liquid is delivered through the aperture 158 to the pressure chamber 156, the pressure being of sufficient magnitude to bulge the tubing sidewalls outwardly between the gripping points and spaced junctions as shown in FIGS. 4 and 7. The water pressure may be applied to the chamber 158 quite rapidly so as to bulge the walls as by impact from within.

When the walls are distended to a predetermined degree as shown in FIG. 7, the first substage 28, carrying the gripping dies 70 and first seal 102, moves downwardly thereby compressing the tubing while the hydraulic pressure is maintained within the chamber 156. When the bottom of the stroke has been attained, the die parts 70 and 86 are in the position as shown in FIG. 8. Here it is seen that the sidewall of the tubing is distended to form an annular corrugation complementary in shape to the cavity 72 defined by the dies 70, 86. The sidewalls of the corrugation thus formed are planar and substantially flat as contrasted to the inwardly dished sidewalls formed by prior methods.

Referring to FIG. 5, the corrugation thus formed, here designated 160, is supported upon the surface 88 of the second dies 86 when the first seal 102 is relaxed, the first split dies 70 retracted, and the first substage 28 moved upwardly to the top of the stroke. The second seal 104 may then be relaxed permitting the water detained in the chamber 156 to be discharged by falling freely over the mandrel 136.

Initially, the lower or second split dies 86 are retained in their gripping relationship with the tubing 68 and cooperate with the second substage 30 to advance the tubing 68 downwardly thereby indexing the tubing 68 to receive a subsequent corrugation. It is to be appreciated that the stroke of the second substage 30 is equal to the axial pitch between convolutions. Varying the stroke, which is selective, varies the pitch of the corrugations.

When the second substage 30 has reached the lower point in its stroke, shown by the broken lines in FIG. 5, the first split dies 70 are actuated to regrip the tubing 68 prior to releasing the second dies 86. After the first dies 70 have regripped the tubing and the first seal 102 has re-established a fluid tight junction with the tubing 68, the second dies 86 are retracted a distance sufficient to clear the corrugation 160 shown in FIG. 6. The second substage 30 is moved to the top of its stroke whereupon the dies 86 are advanced into re-engagement with the tubing 68 as shown in FIG. 7. Here it is seen that the corrugation 160 is received into the complementary cavity 90 disposed below the planar surface 88.

After the second dies 86 and second seal 104 have each operatively engaged the tubing wall, the sequence of operations for forming the second and subsequent corrugation may proceed in the manner described above.

The means for effecting sequential control of the operation of the corrugation forming machine 10 is shown diagrammatically in FIG. 9. More particularly, an electro-mechanical timer mechanism 170 is provided to control the sequence and duration of operation of the various movable parts of the machine 10. The timer 170 includes an electric motor 172 having a rotatable shaft 174, there being a plurality of axially spaced cam members 176 rigidly mounted on the shaft 174. Each of the cams 176 coacts with an electrical contact (not shown) during a revolution of the shaft 174 and cams 176 to supply an electric potential to the several motors and solenoid valves presently to be described.

The hydraulic oil pressure is maintained within the machine 10 by a main pump 178 continuously driven during the operation of the machine 10 by an electric motor 180, the pump 178 being supplied with oil from a sump 182, shown at the bottom of FIG. 9. It is to be understood that the pump 178 has an ample capacity to supply the pressure and oil quantity requirements of the various hydraulically actuated components in the circuits to be presently described. A spring biased oil pressure relief valve 179 is provided on the pump 178 to afford an oil by-pass when a predetermined fluid pressure is exceeded in the circuit, the oil being returned to the sump 182 for recirculation.

The pump 178 delivers oil through a high pressure line 184 to the hydraulic cylinders 32, 34 which vertically actuate the first sub-frame 28. The oil is received in the cylinders 32, 34 through a solenoid actuated hydraulic valve 186, the solenoid being electrically connected to the timer 170 through a multi-conductor electrical conduit 188. Low pressure oil is returned from the valve 186 through a main oil return line 190 which is connected to the valve 186 by a branch line 192. It is to be appreciated that the main oil return line 190 is operatively connected to the oil sump 182 thereby to complete a hydraulic circuit.

The pair of cylinders 80 which horizontally actuate the first split dies 70 is controlled through a solenoid actuated valve 194, the solenoid being controlled from the timer 170. Oil is returned to the line 190 from the valve 194 through a branch oil line 196.

The pair of hydraulic cylinders 60 for vertically actuating the second substage 30 receives hydraulic pressure at precisely timed intervals through a solenoid actuated valve 198, the valve 198 being controlled from the timer 170. Oil is returned from the valve 198 to the sump 182 through a branch line 200 in communication with the return line 190.

The pair of opposed cylinders 94 for horizontally actuating the second split dies 86 receives a supply of high pressured oil through a valve 202. The valve 202 is solenoid actuated and is provided with a manual control as well as being controlled from the timer 170. The manual control feature on the second dies 86 provides for holding the tubing 68 when it is first inserted on the arbor assembly 48. Oil is returned to the sump 182 from the valve 202 through a branch line 204 communicating with the line 190.

A solenoid actuated valve 206 receiving oil under high pressure from the main supply line 184 supplies oil for actuating the first seals 102 through the tubing 122. An oil pressure release line 208 is connected to the valve 206 and to the oil return line 190.

A solenoid actuated valve 210 having optional manual control features selectively delivers oil under pressure to the second seal 104. The manual control of valve 210 provides for selective closing of the second seal 104 when first receiving the tubing 68 over the arbor 48. Oil return is effected from the valve 210 through a branch line 212 communicating with the return line 190.

Water under high pressure (2000 to 4000 p.s.i., for example) is supplied through the spindle 112 from a pump 214 continuously driven during the operation of the machine 10 by an electric motor 216. The pump 214 receives water from a sump 218 and delivers the water to a solenoid actuated valve 220, the solenoid portion 220 being controlled from the timer 170. A spring biased relief valve 221 is provided on the pump 214 to return water to the sump 218 when a predetermined pressure has been exceeded in the circuit. A high pressure water conduit 222 leads from the valve 220 to the hollow center of the spindle 112. A bypass or return water conduit 224 leads from the valve 220 to the sump 218. Water that is supplied to the pressure chamber 156 within the tubing 68 is not returned to the sump 218 but is discharged by gravity from the machine 10 to an associated water trough (not shown).

Thus it is recognized that the corrugation forming machine 10 is automatically controlled from the timer 170 once the corrugation forming cycle has been initiated. The manual control on the valve 202 for the second jaws 86 and the valve 210 for the second seal 104 need only be actuated during the initial installation of the tubing on the mandrel assembly.

When changing from one spacing of corrugation to another, the stroke of the second subframe 30 need only be varied a selected distance.

An essential feature in forming a plurality of corrugations is that the second seal 104 be disposed at the root of the previously formed corrugation, best shown in FIG. 4. The position of the first seal 102 is not critical, it only being necessary that it be sufficiently displaced from the seal 104 to provide therebetween a sufficient expanse of metal for forming the corrugation within the cavity 72.

It has been found that the material of which the seals 102 and 104 are formed is preferably an elastomeric material having durometer readings of between 50 to 60. Such materials may be natural rubber or any synthetic substitute such as neoprene. As employed in the operation 10, the seals 102, 104 have long life in that the extent of flexure is quite moderate, the clearance between the seals in the relaxed position and the walls of the tubing 68 being only a few thousandths of an inch. Because the tubing 68 is not pulled over the seals 102 and 104 during the corrugation forming operation abrasion to the seal is precluded. It is also to be noted that the spaced gripped portions of the tubing 68 are congruent with the joints or fluid tight junctions formed by the seals 102, 104. These points of congruity are fixed throughout the corrugation forming operation. In other words, the tubing 68 does not slide relative to either the first seal 102 or the gripping dies 70 during the downward stroke of the first substage 28.

While there has been described what is at present considered to be the preferred embodiment of the invention, it will be understood that various modifications may be made therein, and it is intended to cover in the appended claims all such modifications as fall within the true spirit and scope of the invention.

The invention is claimed as follows:

1. A method of forming an annular corrugation in a length of metal tubing which includes the steps of forming fluid-tight junctions between the inside wall of the tubing by internally mounting seals disposed within the tubing at two axially spaced locations to define a chamber within the tubing; gripping the outside surface of the tubing directly radially opposite each of said junctions by means of abutment surfaces generally complementary in shape to the corrugation to be formed; applying fluid pressure to the chamber with sufficient force to bulge the tubing wall between said junctions; and then moving at least one of the junctions in unison with the associated tube gripping abutment surface toward the other junction and with continued radial alignment of the junctions and their associated abutment surfaces to reduce the axial distance between the junctions for compressing the tubing wall therebetween while maintaining the fluid pressure within the chamber to further bulge and distend the tubing wall into engagement with abutment surfaces surrounding the same whereby to form an annular corrugation.

2. A method according to claim 1 which further includes the steps of axially advancing the tubing with respect to the seals after the formation of one corrugation and then re-establishing a chamber by forming one of the fluid-tight junctions at the root of the previously formed corrugation and by forming the other junction axially spaced from said root.

3. Apparatus for use in forming an annular corrugation in a length of metal tubing, and comprising a pair of sealing means axially spaced apart for blocking off into a chamber the interior of a portion of a length of the tubing which is to be corrugated; means for mounting said sealing means for movement relative to each other; spaced abutment surface means mounted for selectively and forcibly engaging the outer surface of the tubing directly opposite each of said sealing means; said abutment surface means having portions generally complementary in shape to the sidewalls of the corrugation to be formed; means for supplying fluid to said chamber under pressure sufficient to bulge outwardly the wall thereof; and reversible transport means for moving at least one of said abutment surface means in unison with its associated sealing means toward the other abutment surface means so as to reduce the space of said pair of said sealing means while continuing the forcible engagement between the abutment surface means and the tubing in alignment with said sealing means whereby to form a corrugation.

4. Apparatus according to claim 3 which further includes indexing means cooperable with said abutment surface means for axially advancing the tubing into position for receiving a subsequent corrugation.

5. Apparatus according to claim 4 which further includes control means for said indexing means operative to control the advance of the tubing to a position where one of the sealing means is in registration with the root of an immediately previously formed corrugation.

6. Apparatus according to claim 3 which further includes control means connected to said transport means for varying the converging movements of said sealing means and said abutment surface means whereby to vary the height of the corrugation being formed.

7. Apparatus according to claim 3 which further includes control means connected to said transport means for varying the diverging movements of said sealing means and abutment surface means thereby to vary the pitch between the corrugations being formed.

References Cited by the Examiner
UNITED STATES PATENTS

| | | | |
|---|---|---|---|
| 2,306,018 | 12/1942 | Fentress | 153—73 |
| 2,581,787 | 1/1952 | Dreyer | 153—73 |
| 2,773,538 | 12/1956 | De Mers | 153—73 |
| 2,796,109 | 6/1957 | Wood | 153—73 |
| 2,825,387 | 3/1958 | Alltop et al. | 153—73 |
| 2,954,064 | 9/1960 | De Mers | 153—73 |
| 3,105,539 | 1/1963 | Johnson | 153—73 |
| 3,130,771 | 4,1964 | Peyton | 153—73 |
| 3,141,496 | 7/1964 | Yowell et al. | 153—73 |

CHARLES W. LANHAM, *Primary Examiner.*